(12) United States Patent
McCauley

(10) Patent No.: US 6,610,625 B1
(45) Date of Patent: Aug. 26, 2003

(54) CATALYST/ADSORBENT COMPOSITION WITH IMPROVED PERFORMANCE

(75) Inventor: John McCauley, Finksburg, MD (US)

(73) Assignee: Tricat Industries, Inc., Hunt Valley, MD (US)

( * ) Notice: Subject to any disclaimer, the term of this patent is extended or adjusted under 35 U.S.C. 154(b) by 184 days.

(21) Appl. No.: 09/873,355

(22) Filed: Jun. 5, 2001

Related U.S. Application Data

(60) Provisional application No. 60/232,847, filed on Sep. 15, 2000.

(51) Int. Cl.$^7$ ............................. B01J 21/16; B01J 29/08
(52) U.S. Cl. ............................. 502/68; 502/64; 502/79; 502/84
(58) Field of Search ............................. 502/64, 68, 79, 502/80, 84

(56) References Cited

U.S. PATENT DOCUMENTS

| | | | | |
|---|---|---|---|---|
| 2,882,244 A | | 4/1959 | Milton | |
| 4,657,881 A | * | 4/1987 | Crampton et al. | 502/80 |
| 4,981,825 A | * | 1/1991 | Pinnavaia et al. | 502/63 |
| 5,160,032 A | * | 11/1992 | Holmgren et al. | 208/46 |
| 5,371,273 A | * | 12/1994 | Shima et al. | 560/212 |
| 5,932,509 A | * | 8/1999 | Balse et al. | 502/65 |
| 6,127,299 A | * | 10/2000 | de Boer et al. | 502/56 |
| 6,149,799 A | * | 11/2000 | Raybaud et al. | 208/49 |
| 6,235,670 B1 | * | 5/2001 | Benazzi et al. | 502/63 |
| 6,303,531 B1 | * | 10/2001 | Lussier et al. | 502/84 |

* cited by examiner

*Primary Examiner*—Tom Dunn
*Assistant Examiner*—Christina Ildebrando
(74) *Attorney, Agent, or Firm*—McDermott, Will & Emery

(57) ABSTRACT

Catalytic and/or adsorbent compositions are formed with greater flexibility to optimize various properties, such as strength and catalytic activity by employing a synthetic clay binder having a small particle size, e.g., an average particle size no greater than about 100 nm. Embodiments of the present invention comprise compositions containing a catalytic component and/or adsorbent component and laponite which functions as a binder either alone or with an additional binder component. Embodiments of the present invention further include a catalytic and/or adsorbent composition containing an inorganic binder and laponite as a lubricant to facilitate shaping, as by extrusion.

35 Claims, No Drawings

CATALYST/ADSORBENT COMPOSITION WITH IMPROVED PERFORMANCE

RELATED APPLICATIONS

This application claims priority from provisional patent application Ser. No. 60/232,847, filed on Sep. 15, 2000, entitled "CATALYST/ADSORBENT COMPOSITION WITH IMPROVED PERFORMANCE", the entire disclosure of which is incorporated by reference herein.

TECHNICAL FIELD

The present invention relates generally to catalytic adsorbent compositions exhibiting improved activity and/or improved physical properties. The invention has particular applicability in the manufacture and use of molecular sieve adsorbents for separating gases from a mixture, particularly for selectively adsorbing oxygen nitrogen and reformed regenerated catalysts for use in refining.

BACKGROUND ART

Most all catalytic and/or adsorbent compositions contain an active component and a binder component which is normally inactive. Zeolites, an active component in many catalyst and/or adsorbent compositions, have a three dimensional network of basic structural units consisting of $SiO_4$ and $AlO_4$ tetrahedral linked to each other by sharing of apical oxygen atoms. Silicon and aluminum atoms lie at the center of the tetrahedral. The resulting aluminosilicate structure which is generally highly porous possesses three dimensional pores the access to which is through molecular sized windows. In a hydrated form, the preferred zeolites are generally represented by the following formula (I).

$$M_2{}^nO:Al_2O_3:xSiO_2:wH_2O \qquad (I)$$

where "M" is a cation which balances the electrovalence of the tetrahedral and is generally referred to as an extra framework exchangeable cation, n represents the valency of the cation, x and w represent the moles of $SiO_2$ and water, respectively.

The attributes which make zeolites attractive for separation include an unusually high thermal and hydrothermal stability, uniform pore structure, easy pore aperture modification and substantial adsorption capacity even at low adsorbate pressures. Furthermore, zeolites can be produced synthetically under relatively moderate hydrothermal conditions. Zeolites of type X structure as described and defined in U.S. Pat. No. 2,882,244 are particularly suitable as adsorbents for adsorption separation of gaseous mixtures. The zeolite content of such particles may vary from 30 wt. % to nearly 100 wt. %, depending on the type and amount of binder used.

Zeolites and other active components, however, exhibit very little cohesion. Accordingly, it is necessary to employ appropriate binders to manufacture a catalyst and/or adsorbent composition in the form of particles, such as extrudates, aggregates, spheres or granules, to suit commercial applications. Many different types of catalyst and/or adsorbent compositions would enjoy greater utility if the amount of the active component could be increased. However, this objective is not easily achieved because of the necessity to employ an effective binder to achieve the strength required for a particular application of the catalyst and/or adsorbent composition. Conventional binders employed in fabricating catalyst and/or adsorbent compositions include natural clays, such as bentonite, kaolin and attapulgite, for agglomerating zeolite powders. Attempts are normally made to maximize the amount of the active component; however, reducing the amount of binder sacrifices particle integrity.

There exists a need for catalyst and/or adsorbent compositions exhibiting improved activity without any sacrifice or compromise in physical properties such as strength, i.e., attrition resistance. There exists a particular need for such improved catalyst and/or adsorbent compositions for gas separation and fluidized catalytic cracking (FCC) applications.

DISCLOSURE OF THE INVENTION

An advantage of the present invention is a catalyst and/or adsorbent composition exhibiting improved activity and improved physical properties, such as strength.

Another advantage of the present invention is an improved adsorbent composition suitable for use in separating oxygen nitrogen from a gaseous mixture.

Another advantage of the present invention is a reconstituted catalyst composition.

Another advantage of the present invention is a method of manufacturing a reconstituted catalyst composition.

Additional advantages and other features of the present invention will be set forth in part in the description which follows and in part will become apparent to those having ordinary skill in the art upon examination of the following or may be learned from the practice of the present invention. The advantages of the present invention may be realized and obtained as particularly pointed out in the appended claims.

According to the present invention, the foregoing and other advantages are achieved in part by a catalyst and/or adsorbent composition comprising an active component and laponite.

Another aspect of the present invention is a method of manufacturing a reconstituted catalyst composition, the method comprising: selecting particles, having a first particle size, of a catalyst composition containing a catalytic component and an inorganic binder; grinding the particles to a second particle size; mixing the ground particles with laponite as an additional binder; shaping the mixed ground particles and laponite; and calcining the shaped mixture.

Embodiments of the present invention comprise compositions comprising laponite as a binder in an amount of about 5 wt. % to about 20 wt. %, e.g., less than about 10 wt. %. Embodiments of the present invention further comprise compositions comprising laponite together with another conventional binder, as in an amount of about 0.1 wt. % to about 10 wt. % of an additional inorganic conventional binder, such as a natural clay or alumina. Further embodiments of the present invention comprise compositions comprising laponite which functions as a lubricant during catalyst composition fabrication, as during extrusion. Embodiments of the present invention also comprise compositions containing a catalytic and/or adsorbent component and a synthetic clay binder having an average particle size less than about 100 nm, such as laponite.

DESCRIPTION OF THE INVENTION

The present invention stems from the discovery that synthetic clays having a very small particle size, such as laponite, can be advantageously and effectively employed as a binder in various applications in which binders, such as natural clay binders, have previously been employed. Because of their high external surface area, various synthetic clays, particularly laponite, can be used in smaller quantities than conventional materials heretofore employed as binders, and with greater effectiveness. Thus, laponite can be employed as a binder in compositions containing zeolites and/or various types of catalysts or adsorbents. Such compositions can be employed in various applications for which such zeolites and/or catalysts or adsorbents have previously been employed, particularly with a binder. Such applications include various catalytic cracking techniques, including fluidized catalytic cracking, hydrotreating, refining, gas purification, gas separation, catalytic converters, including catalytic converters on automotive exhaust systems and industrial exhaust systems, pollutant control, such as $SO_x$, $NO_x$, and $H_2S$ removal, ion exchange, and the regeneration of spent catalysts. In accordance with embodiments of the present invention, laponite can also be employed as a binder in various other industrial applications wherein clay binders have previously been employed, including electronic, pharmaceutical, medical, and ceramic applications.

Laponite is a synthetic low-charge clay which closely resembles both the structure and chemical composition of hectorite clay mineral. This type of clay is a trioctahedral analogue of magnesium silicate montmorillonite, but contains a significant amount of octahedral Li-for-Mg substitution. Other acidic species can also adsorb on the basal surfaces and in the interlamellar spaces. However, unlike the natural mineral, laponite is very pure and low in metal content and other impurities. The primary particles of laponite are disc-shaped with approximately 25 nm diameter and 1 nm thickness.

Laponite is commercially marketed under the tradename laponite by Rockwood Specialities, Inc. of Princeton, N.J. through its subsidiary, Southern Clay Products, Inc. It is a layered hydrous magnesium silicate, in which magnesium ions, partially replaced by suitable monovalent ions such as lithium, sodium, potassium and/or vacancies, are octahedrally coordinated to oxygen and/or hydroxyl ions, some of which may be replaced by fluorine ions, forming the central octahedral sheet; such an octahedral sheet is sandwiched between two tetrahedral sheets of silicon ions, tetrahedrally coordinated to oxygen. The primary particle size of such clay platelets are typically 25 nm in lateral dimension and 1 nm in thickness.

There are several grades of laponite such as RD, RDS, J, S, etc. each with unique characteristics and which can be used in embodiments of the present invention. Some of these products contain a polyphosphate peptizing agent such as tetrasodium pyrophosphate for rapid dispersion capability; alternatively, a suitable peptizer can be incorporated into laponite later on for the same purpose.

In embodiments of the present invention, the primary particle size of laponite can be selected on the basis of achieving optimum adhesive strength while maximizing the amount of catalytic and/or adsorbent component. Given the disclosed objective and guidance herein, an optimum primary particle size for laponite can be selected in a particular situation. For example, it was found suitable to employ laponite having a particle size less than about 100 nm in diameter (or largest dimension) and less than 10 nm in thickness (or smallest dimension). An optimum primary particle size for the laponite should be less than about 250 nm in diameter and less than about 3 nm in thickness, e.g., less than about 100 nm in diameter and less than about 1 nm in thickness. Embodiments of the present invention include compositions comprising a catalytic and/or adsorbent component and laponite in an amount of about 5 wt. % to about 20 wt. %. Suitable amounts of laponite, functioning as a binder, include amounts less than about 10 wt. %, and even less than about 8 wt. %.

Embodiments of the present invention further include compositions comprising a catalytic and/or adsorbent component containing about 2 wt. % to about 3 wt. % of laponite and about 0.1 wt. % to about 10 wt. % of a conventional binder component, such as a natural clay or alumina. Because of its high binding properties, a small amount of laponite can be employed with a considerably smaller amount of a conventional binder. Conventional binders are normally employed in an amount of 15 wt. % to about 20 wt. %. Hence, by incorporating a small amount of laponite as a binder, e.g., about 2 wt. % to about 3 wt. %, the amount of the conventional binder can be reduced within a range of about 0.10 wt. % to about 10 wt. %.

Advantageously, the primary particle of laponite is about an order of magnitude smaller than that of the naturally occurring clay. Such a large external surface area of laponite creates more opportunity for bonding to occur resulting in products that are either harder or require less binder than products than contain conventional clays with larger size preliminary particles.

Due to its high binding ability, compositions containing a catalytic and/or adsorbent component can be prepared employing laponite in an amount commensurate with the amount of the conventional binder resulting in a composition exhibiting a significantly increased strength. The use of laponite, therefore, enables greater flexibility to optimize strength and catalytic activity for a particular industrial application. Thus, compositions containing an equivalent strength or even higher strength than in conventional compositions with a conventional binder can be achieved with improved catalytic activity by virtue of the reduced amount of laponite required to achieve a strength that is commensurate or even greater than the strength of compositions containing a conventional binder.

In another embodiment of the present invention, laponite is used as a lubricant in preparing catalytic compositions. It was found that laponite advantageously functions as a lubricant, particularly when extruding a composition containing a catalytic and/or adsorbent component and a conventional binder. The amount of laponite suitable for incorporation in a composition for improved lubricity can range from about 1 wt. % or less.

The use of laponite as a binder advantageously improves the attrition resistance of compositions containing a catalytic and/or adsorbent component, thereby rendering such compositions even more suitable for use in FCC applications. Compositions in accordance with the present invention fabricated utilizing laponite as a binder are also suitable for various hydrotreating, cracking, hydroprocessing, isomerizing, reforming and hydrogenating applications. Embodiments of the present invention include compositions containing a catalytic and/or adsorbent component and laponite as a binder in various shapes, such as beads, spray dried particles, extrudates, pellets and tablets.

In another embodiment of the present invention, a catalyst is reconstituted for use in various applications, such as hydrotreating. Conventional manufacturing techniques disadvantageously result in a large amount of waste catalytic particles which are off specification, e.g., have a particle size which is too fine for the designed application. In accordance with embodiments of the present invention, such particles, typically containing a catalytic and/or adsorbent component and a conventional binder, are ground together with a suitable amount of laponite, e.g., about 5 wt. % to about 8 wt. % laponite, shaped, as by extrusion, and calcined. Such a reformed catalyst can then be formed in a suitable size, e.g., extrudates of about 1/16 to about 1/20 of an inch in diameter. For the regeneration embodiment of the present invention, it was found particularly suitable to employ RD, RDS, and S types of laponite.

Compositions in accordance with embodiments of the present invention enjoy particular applicability in air separation. In preparing catalyst particles for air separation, it is important for the binder to allow the formed shape to exhibit sufficient green strength. Embodiments of the present invention, therefore, include compositions containing an adsorbent component and laponite in an amount less than about 15 wt. %, e.g., about 5 wt. % to about 10 wt. %.

It was found that compositions containing a zeolite, such as Li-LSX, exhibit particularly suitability as an adsorbent for selectively removing gases from a gaseous mixture, such as selectively adsorbing nitrogen from a gaseous mixture containing oxygen and nitrogen. Li-LSX is basically a zeolite X in which a large number of original sodium ions have been replaced by lithium ions.

In other embodiments of the present invention, a spent hydrotreating catalyst is regenerated to remove carbonaceous deposits and to remove chemicals that have decreased its activity. The regenerated material does not exhibit the type of activity commensurate with fresh material because a good part of its physical integrity has deteriorated into broken pieces and dust. However, such a spent catalyst composition is reformed in accordance with embodiments of the present invention by grinding to reduce particle size, and reshaping into another form or a different size of extrudate with laponite followed by calcining. The reformed material is capable of adsorbing impurities that would otherwise deactivate a fresh catalyst, thereby extending the useful life of the fresh catalyst. In regenerating catalysts, the reconstituted catalyst preparations should be ground to a suitable size, such as less than about 50 microns average particle size, e.g., to about 20 microns particle size, to optimize activity and crush strength. To maximize strength, the regenerated catalyst should be ground to less than about 3 microns average particle size. The binder content for such catalysts should be less than about 20 wt. %, e.g., about 5 wt. % to about 10 wt. %.

EXAMPLE—1

Li-LSX was mixed with 15% attapulgite clay in one formulation and with 10% laponite clay in another formulation. The formulations were formed into spheres and evaluated for oxygen/nitrogen adsorption capacity and selectivity. The adsorbent containing laponite demonstrated better than expected capacity and selectivity when compared to the formulation containing attapulgite clay.

EXAMPLE—2

A spent cobalt molybdenum hydrotreating catalyst was regenerated, ground to 3 microns average particle size and extruded into 1/8" cylinders. In one case, the formulation contained 22% alumina binder (HiQ-40 from Alcoa); in another case the formulation contained 8% laponite binder (from Southern Clay Products). The crush strength of both reformed catalysts was found to be 3.7 lb/mm. This example demonstrates that equivalent crush strength can be obtained from laponite at much lower concentration levels when compared to an alumina binder. It follows that a catalyst using only 8% binder would be more active because it is diluted less than a catalyst containing 22% binder.

The present invention advantageously enables the manufacture of various types of compositions containing various catalytic and/or adsorbent components exhibiting superior activity and superior physical properties. The use of laponite advantageously provides superior binding at reduced amounts, thereby enabling the fabrication of catalytic and/or adsorbent compositions with greater flexibility to optimize strength and activity. The present invention enjoys industrial applicability in various technological areas, such as electronic, pharmaceutical, medical, ceramic and refining industries. Embodiments of the present invention enjoy particular applicability in gas separation and hydrotreating applications.

In the preceding detailed description, the present invention is described with reference to specifically exemplary embodiments thereof. It will, however, be evident that various modifications and changes may be made thereto without departing from the broader spirit and scope of the present invention, as set forth in the claims. The specification and drawings are, accordingly, to be regarded as illustrative and not restrictive. It is understood that the present invention is capable of using various other combinations and environments and is capable of changes or modifications within the scope of the inventive concept as expressed herein.

What is claimed is:

1. A composition comprising:
   a catalytic and/or adsorbent component comprising LiLSX; and
   laponite.

2. The composition according to claim 1, comprising an adsorbent for selectively adsorbing nitrogen from a gaseous mixture, wherein the laponite functions as a binder.

3. The composition according to claim 2, comprising about 5 wt.% to about 10 wt. % laponite.

4. The composition according to claim 3, wherein the adsorbent comprises LiLSX.

5. The composition according to claim 1, in the form of a reconstituted catalyst composition and further comprising an additional binder component.

6. The composition according to claim 5, wherein laponite is present in an amount of about 5 wt. % to about 8 wt. %.

7. A method of manufacturing a reconstituted catalyst composition, the method comprising:
   selecting particles, having a first particle size, of a catalyst composition containing a catalytic component comprising a zeolite and an inorganic binder;
   grinding the particles to a second particle size;
   mixing the ground particles with laponite as an additional binder;
   shaping the mixed ground particles and laponite; and
   calcining the shaped mixture.

8. The method according to claim 7, comprising mixing the ground particles with about 5 wt. % to about 8 wt. % laponite.

9. The method according to claim 7, comprising grinding the particles to the second particle size with an average particle size less than about 25 microns.

10. The method according to claim 9, comprising grinding the particles to the second particle size with an average particle size less than about 3 microns.

11. The method according to claim 7, comprising mixing the ground particles with laponite having an average particle size less than about 100 nm.

12. A method of manufacturing an adsorbent composition, the method comprising:
   preparing a mixture comprising zeolite particles, an inorganic binder and laponite particles;

shaping the mixture; and calcining.

13. The method according to claim 12, wherein the mixture comprises:
    about 5 wt. % to about 8 wt. % of an the inorganic binder; and
    less than about 5 wt. % of laponite which functions as a lubricant.

14. The method according to claim 13, comprising shaping the mixture by extrusion.

15. A composition comprising:
    a catalytic and/or adsorbent component comprising a zeolite;
    laponite; and
    a binder component comprising a clay or alumina.

16. The composition according to claim 3, wherein the laponite functions as a binder.

17. The composition according to claim 16, comprising about 5 wt. % to about 20 wt. % laponite.

18. The composition according to claim 17, comprising less than about 10 wt. % laponite.

19. The composition according to claim 18, comprising less than about 8 wt. % laponite.

20. The composition according to claim 16, further comprising another binder component different from laponite.

21. The composition according to claim 20, comprising:
    about 2 wt. % to about 3 wt. % of laponite and
    about 0.1 wt. % to about 10 wt. % of the other binder component.

22. The composition according to claim 21, wherein the other binder component comprises a clay or alumina.

23. The composition according to claim 16, wherein the laponite has an average particle size less than about 100 nm.

24. The composition according to claim 16, wherein the laponite has a primary particle size of less than about 1000 nm as its largest dimension.

25. The composition according to claim 24, wherein the laponite has a primary particle size of less than about 250 nm as its largest dimension.

26. The composition according to claim 25, wherein the laponite has a primary particle size of less than about 100 nm as its largest dimension.

27. The composition according to claim 15, further comprising a binder component; wherein laponite functions as a lubricant during shaping.

28. The composition according to claim 27, comprising less than about 5 wt. % laponite.

29. The composition according to claim 15, comprising about 5 wt. % to about 20 wt. % laponite.

30. The composition according to claim 29, comprising less than about 10 wt. % laponite.

31. The composition according to claim 30, comprising less than about 8 wt. % laponite.

32. The composition according to claim 15, comprising:
    about 2 wt % to about 3 wt. % of laponite and
    about 0.1 wt. % to about 10 wt. % of the clay or alumina.

33. The composition according to claim 15, wherein the laponite has an average particle size less than about 100 nm.

34. The composition according to claim 31, comprising less than about 5 wt. % laponite.

35. The composition according to claim 15, comprising an adsorbent for selectively adsorbing nitrogen from a gaseous mixture, wherein the laponite functions as a binder.

* * * * *